May 11, 1954  D. E. BLACKFORD  2,678,186
LOCKING VALVE FOR CONTROLLING FUEL GAS
Filed Nov. 28, 1952

INVENTOR.
DONALD E. BLACKFORD
BY
Barnes, Kisselle, Laughlin & Raisch
ATTORNEYS.

Patented May 11, 1954

2,678,186

UNITED STATES PATENT OFFICE 2,678,186

LOCKING VALVE FOR CONTROLLING FUEL GAS

Donald E. Blackford, Plymouth, Mich., assignor to Lincoln Brass Works, Inc., Detroit, Mich., a corporation of Michigan Application November 28, 1952, Serial No. 323,034

3 Claims. (Cl. 251—105)

This invention relates to a valve for the control of the flow of gas to a gas burner and it has to do particularly with a valve especially useful with certain types of heating apparatus.

In some gas heaters, it is desirable to have the gas supplied thereto at relatively infrequent intervals. For example, with some types of so-called floor heaters which are often used in relatively mild climates, the supply of gas to the burner and the cutting off of the supply of gas to the burner may, in some instances, be seasonal. Other heaters may be disposed in quite an accessible position and the operation thereof may be at relatively infrequent intervals, or maybe the heater is installed in a place where the valve may be operated by different persons from time to time. An object of the invention is to provide a valve construction which is effectively locked when it is in off position to thereby assure that it is not accidently turned to on position during any long period when it is supposed to be in off position and so that different persons may not accidently brush against or turn the valve to on position. In this connection, a simple, effective, strong locking arrangement is provided which requires actually two operations or two different movements to unlock the valve and to manipulate it to its on position. The simplicity of the structure minimizes the number of small parts thus facilitating manufacture and at the same time, providing a locking construction which has little or no tendency to get out of order or to otherwise become defective in operation.

A valve constructed in accordance with the invention is shown in the accompanying drawings.

Figure 3:
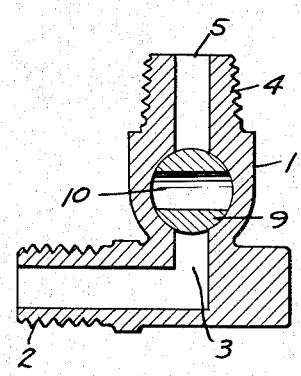
Fig. 3 is a cross sectional view taken on line 3—3 of Fig. 2 showing the valve in off position.
Figure 4:
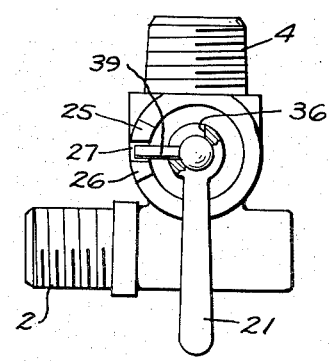
Fig. 4 is a top plan view illustrating the handle shifted to on position.

The valve structure, itself, may be relatively simple comprising a body 1 formed with a threaded extension 2 having an inlet passage 3 therein and a threaded extension 4 with an outlet passage 5. Insofar as the invention is concerned, the inlet and outlet passages may be reversed and the passage 3 need not be angular as illustrated in Fig. 3. The body 1 has a tapered valve chamber therein as shown at 8 and positioned in this chamber is a tapered valve member 9 having a port 10. The valve chamber is open at opposite ends and the valve member has a threaded extension 12. A washer 13 engages against the body and the extension 12 extends therethrough and has a coil spring 14 positioned around it which is held in position by one or more nuts 15 screw threaded onto the extension. The spring thus reacts against the washer which abuts the body and holds the tapered valve member on its seat.

Figure 1:
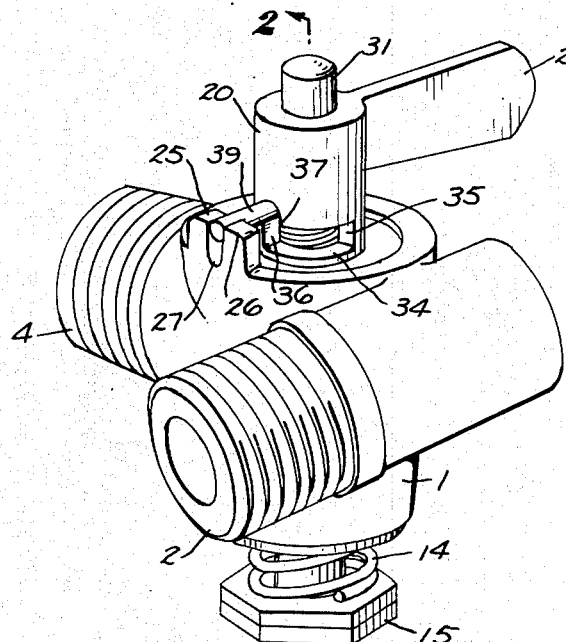
Fig. 1 is a perspective view of the valve showing some of the locking features.
Figure 2:
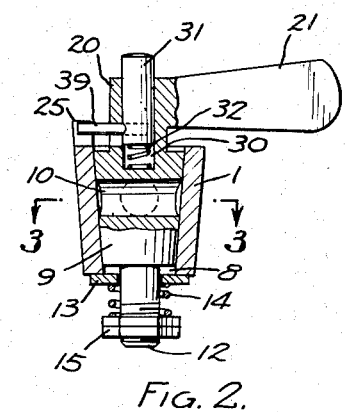
Fig. 2 is an ensmalled sectional view taken substantially on line 2—2 of Fig. 1 showing the valve in off position.

The valve member also has an extension 20 positioned opposite the extension 12 and a handle 21. The handle, extension 20 and valve member may be formed of one integral casting as illustrated although the parts might be made separately and assembled. When the valve is in the position shown in Figs. 1, 2 and 3, it is in off position as will plainly be seen in Fig. 3, the port 10 being positioned transverse to the passages 3 and 5. If the handle 21 is manipulated through about 90°, the port 10 is registered with the passages 3 and 5 and the gas may flow therethrough.

The locking device resides in two upstanding projections or lugs on the body as indicated at 25 and 26, forming between them a locking notch 27. These may be formed integrally with the body. The projection 20 of the valve member is provided with an axial bore or cavity 30 for slidably receiving a plunger 31. A coil spring 32 is positioned in the bottom of the cavity and acts against the plunger to normally urge it upwardly.

The wall of the extension 20 is cut away to provide an arcuate slot 34 which communicates into the bore 30, this slot having an end wall 35 and an end wall 36. The slot at one end is formed with a locking notch 37, one side of which may be flush with the wall 36.

A locking pin 39 is securely fastened to the plunger 31 to extend laterally therefrom so that it extends out through the slot 34 and lies in the notch 27. The pin 39 may be press fitted into the plunger 31. In making the assembly the plunger is first disposed in the chamber 30 and then the pin 39 is located with its outer end disposed in the notch 27. The pin 39 is securely fastened to the plunger 31, as by means, for example, as a press fit.

With this construction, it will be noted that the pin 39 is a stationary element in the sense that it has no rotary movement with the valve member. Its outer end is permanently located in the slot bearing constituted by the slot 27 and its inner end is permanently located in the plunger 31. The spring 32 normally projects the plunger upwardly. In the off position of the valve, the plunger and pin are shifted upwardly and the pin is seated in the locking notch 37. Its outer end remains in the slot bearing. Thus, the valve member cannot be turned. It is important to point out that the pin 39 acts as a beam in that both ends of the pin are held in a fixed position and the extension 20 acts upon the portion of the pin between its two ends. To open the valve the plunger 31 is depressed thus lowering the pin 39. The slot 27 has sufficient depth for this purpose. The pin moves out of the locking notch 37 and into alignment with the slot 34 and the valve may be turned until the shoulder 35 strikes the pin which is the full on position. Even though the plunger 31 is slidable and rotatable in the extension 20, the inner end of the pin 39 is nevertheless strongly held and supported in position. Thus any force delivered thereto by the shoulder 35 is resisted as the pin acts as a beam supported at both ends and not as a cantilever. To turn the valve off the handle is turned in the opposite direction, the movement being limited when the shoulder 36 strikes the pin 39 and the spring projects the plunger and the pin upwardly to seat the pin in the notch 37.

I claim:

1. A locking valve comprising, a valve body having a valve chamber therein, a valve member rotatably seated in the chamber, the valve body and valve member having passages arranged to be brought into and out of registry in different rotary positions of the valve member in the valve chamber, the valve member having a portion projecting from the chamber which portion has a substantially cylindrical bore therein, a substantially cylindrical plunger in the bore, the said portion having an arcuate slot therein connecting into the bore, a locking pin projecting generally radially through the slot, the inner end of the pin being fixed to the plunger, the valve body having a bearing slot therein, the outer end of the pin being disposed in the bearing slot and thereby secured against rotation relative to the valve body, the said portion of the valve member having a locking notch communicating with the arcuate slot, and a spring acting upon the plunger for holding the locking pin in the locking notch, said plunger being shiftable against the spring to remove the pin from the locking notch for the turning of the valve.

2. A locking valve comprising, a valve body having a valve chamber therein, a valve member rotatably seated in the chamber, the valve body and valve member having passages arranged to be brought into and out of registry in different rotary positions of the valve member in the valve chamber, the valve member having a portion projecting from the valve body, and having an axially extending, substantially cylindrical bore therein, a substantially cylindrical plunger axially shiftable and rotatably positioned in the bore, the said portion having a lateral, circumferentially extending slot communicating into the bore, the valve body having a bearing slot, a locking pin extending generally radially through the lateral slot having its inner end fixed to the plunger and its outer end permanently located in the bearing slot whereby it is mounted as a stationary beam relatively to forces acting laterally thereon, the lateral slot having a generally axially extending locking notch therein, a spring in the bore acting upon the plunger and seating the locking pin in the locking notch, the plunger projecting from the said portion of the valve member so that it may be actuated against the spring to release the locking pin from the locking notch for the turning of the valve member.

3. A locking valve of the type defined in claim 2 wherein there is a projection on the periphery of the valve body which is radially spaced from said projecting portion of the valve member, said projection having a recess therein constituting said bearing slot.

References Cited in the file of this patent

UNITED STATES PATENTS

| Number | Name | Date |
| --- | --- | --- |
| 725,660 | Biot | Apr. 21, 1903 |
| 861,501 | Case | July 30, 1907 |
| 1,139,208 | McMurray | May 11, 1915 |
| 1,757,550 | Smith | May 6, 1930 |
| 2,111,998 | Stuckenholt | Mar. 22, 1938 |